United States Patent [19]

Duncan et al.

[11] Patent Number: 4,539,368
[45] Date of Patent: Sep. 3, 1985

[54] TECHNOLOGY FOR THE PRODUCTION OF INVERSE EMULSION POLYMERS

[75] Inventors: John J. Duncan, Mableton; Andrejs Zvejnieks, Atlanta, both of Ga.

[73] Assignee: AZS Corporation, Atlanta, Ga.

[21] Appl. No.: 634,539

[22] Filed: Jul. 26, 1984

[51] Int. Cl.$^3$ .......................... C08K 5/36; C08L 33/00
[52] U.S. Cl. ...................................... 524/748; 524/801
[58] Field of Search ............................... 524/748, 801

[56] References Cited

U.S. PATENT DOCUMENTS

| | | | |
|---|---|---|---|
| Re. 28,474 | 7/1974 | Anderson et al. | 523/336 |
| Re. 28,576 | 10/1975 | Anderson et al. | 523/336 |
| 3,251,816 | 5/1966 | Furendal et al. | 526/911 |
| 3,284,393 | 11/1966 | Vanderhoff et al. | 526/911 |
| 3,714,100 | 1/1973 | Biale et al. | 524/748 |
| 3,997,492 | 12/1976 | Kane et al. | 524/812 |
| 4,077,930 | 3/1978 | Lim et al. | 524/801 |
| 4,363,886 | 12/1982 | Lipowski et al. | 524/801 |

FOREIGN PATENT DOCUMENTS

| | | | |
|---|---|---|---|
| 498407 | 12/1953 | Canada | 524/748 |
| 2030578 | 4/1980 | United Kingdom | 524/801 |

*Primary Examiner*—Ronald W. Griffin
*Attorney, Agent, or Firm*—Oblon, Fisher, Spivak, McClelland & Maier

[57] ABSTRACT

A process for preparing a water-in-oil emulsion of an anionic polymer which comprises emulsion polymerizing an anionic monomer in a water-in-oil emulsion containing a mixture of anionic and nonionic surfactants.

8 Claims, No Drawings

TECHNOLOGY FOR THE PRODUCTION OF INVERSE EMULSION POLYMERS

BACKGROUND OF THE INVENTION

1. Field of the Invention

The present invention relates to an improved method for preparing anionic polymers utilizing water-in-oil emulsion polymerization.

2. Description of the Prior Art

Water-in-oil emulsion polymerization was suggested by Vanderhoff in U.S. Pat. No. 3,284,393. The Vanderhoff technique proposed polymerizing water-soluble monomers utilizing a water-in-oil emulsion polymerization system. The process of Vanderhoff utilized a water-in-oil emulsifying agent to emulsify the water in the oil and conventional polymerizing initiators. The resulting polymer emulsion, a polymer latex, could then be broken to recover the polymer or utilized as is. The Vanderhoff polymerization technique provides a good technique for producing nonionic polymers, however, attempts to utilize the Vanderhoff system to prepare anionic polymers has proven to be less than successful. When preparing anionic polymers, rather than obtaining a polymer latex, one obtains a polymer mixture composed of polymer latex and gritty polymer particles, that is nonemulsified polymers.

Water soluble polymers produced by the Vanderhoff technique are used as flocculants and rheology modifiers for aqueous systems. Anderson in U.S. Pat. Nos. Re. 28,474 and Re. 28,576 discloses a technique for rapidly dissolving the water soluble polymers prepared by the Vanderhoff technique in aqueous medium. Briefly, the Anderson technique involves forming a water-in-oil emulsion of the polymer and then inverting this emulsion into the aqueous medium. According to Anderson, this technique provides for rapid dissolution of the polymer into the water. The Anderson technique suffers from the distinct drawback that one first must prepare the water-in-oil emulsion. This emulsion can be prepared by emulsifying solid polymer or alternatively by conducting the polymerization utilizing the Vanderhoff technique and then inverting the resulting product in an aqueous medium. Obviously, utilizing the product of the Vanderhoff polymerization technique, the polymer latex, would be far more efficient than forming a water-in-oil emulsion from solid polymer. With nonionic polymers this appears to be possible, however, with anionic polymers the Vanderhoff polymerization technique produces a gritty polymer product which is not suitable for commercial use and it is necessary to first remove the grit from the polymer latex. Furthermore, emulsions whether prepared by the Vanderhoff technique or the Anderson technique have proven to have unsatisfactory short shelf lives.

Kane in U.S. Pat. No. 3,997,492 discloses a polymer emulsion system suitable for dissolving a polymer in water comprising finely divided polymer, aliphatic hydrocarbon liquid and a combination of nonionic surfactants. The choice of the surfactants is dictated by the properties of the aliphatic hydrocarbon liquid, in particular the London coefficient unit and other factors. When the Kane technique is applied to anionic polymers an unsatisfactory emulsion results.

Accordingly, a need continues to exist for a technique providing stable water-in-oil emulsions of anionic polymers.

SUMMARY OF THE INVENTION

It is an object of the present invention to provide a stable water-in-oil emulsion comprising an anionic polymer system.

It is still a further object of the present invention to provide for a water-in-oil polymerization system capable of producing anionic polymers having very low grit content.

It is yet another object of the present invention to provide for water-in-oil anionic polymeric emulsions which have a long shelf life.

These and other objects of the present invention which will become apparent from the description which follows, have been achieved by conducting the polymerization of the monomers which produce anionic polymer in a water-in-oil emulsion containing a mixture of nonionic surfactants and anionic surfactants.

DESCRIPTION OF THE PREFERRED EMBODIMENTS

Essentially any anionic monomer may be used in the present emulsion polymerization technique, the only criteria is that the final polymer be water soluble, preferably at least 1–2% water soluble, still more preferably at least 5% water soluble. When the anionic polymer comprises a mixture of monomers, water insoluble anionic monomers may be employed provided the final product is water soluble. Suitable anionic monomers include sodium styrene sulfonate, 2-sulfoethylacrylate, 2-sulfomethacrylate, 2-acrylamido-2-methylpropane sulfonic acid (AMPS), and other sulfonated acrylamides, methallylsulfonate, vinylsulfonate, acrylic acid, methacrylic acid, sodium or ammonium acrylate, sodium or ammonium methacrylate and sulfoethylmethacrylate. The anionic monomer may comprise from as little as about 1% of the total polymeric composition by weight up to 100% by weight.

Essentially any nonionic monomer may be employed in combination with the anionic monomers. The preferred nonionic monomers are ones which are water soluble. However, water insoluble nonionic monomers may be used provided that the polymer with an anionic monomer is water soluble. Typical nonionic monomers include 2-hydroxyethylmethacrylate, methacrylamide, acrylamide, 2-hydroxyethylacrylate, 3-hydroxypropylacrylate, glycidyl methacrylate and the like.

The specific nonionic surfactant which is utilized is not critical and any of the known nonionic surfactant useful in preparing water-in-oil emulsions may be utilized. Typical of these surfactants are the sorbitan esters of fatty acids and such as the Span and Tween series of nonionic surfactants available from I.C.I. Americas. In selecting the specific nonionic surfactant, it has been found useful to select surfactants or surfactant mixtures as a function of the HLB of the nonionic surfactant mixture. Generally, the HLB of the nonionic surfactant blend should increase as the anionic monomer content in the polymerization mixture is increased. Also, as the aromatic content of the oil phases increased it may also be desirable to increase the HLB of the nonionic surfactant employed. Increasing and decreasing the HLB of the surfactant is comparatively easy. One may select a surfactant with the appropriate HLB or one may mix two surfactants to obtain an average HLB which is suitable. The mixing of nonionic surfactants having different HLB's to provide a surfactant mix with the appropriate HLB is well known in the art.

The anionic surfactants which may be employed are any anionic surfactant which is oil soluble and which will provide stable monomer and polymer emulsions. Particularly preferred are the sulfosuccinates, particularly preferred are the dialkyl sulfosuccinates including sodium dioctylsulfosuccinate, sodium ditridecylsulfosuccinate, sodium didecylsulfosuccinate or blends thereof.

In general, the HLB of the nonionic surfactant will range from about 3 to about 10, preferably from about 4.5 to about 9.5 and particularly from about 5 to about 9.0.

The anionic surfactants are often sold in admixture with water or water and alcohol. When calculating the amount of anionic surfactant, one calculates the percentage of anionic surfactant based upon the total amount of active surfactant added. The total amount of surfactant utilized based upon the total composition may range from about 1 to about 20 wt. %, more preferably from about 2 to 15 wt. %, still more preferably from 2 to 10 wt. % and most preferably from 3 to 6 wt. %. The amount of anionic surfactant of the total surfactant will range from about 0.5 to 50 wt. %, still more preferably from 1 to 50 wt. % and more preferably from 4 to about 45 wt. %. When the oil phase is high in aromatic content, the total percentage of anionic in the surfactant is preferably on the order of about 0.5 to 25 wt. % of the surfactant blend.

The oil phase may comprise essentially any inert hydrophobic liquid and include hydrocarbons, halogenated hydrocarbon and aryl compounds including aryl hydrocarbons. Typical oil phase materials include benzene, xylene, toluene, mineral oils, kerosenes, naphthas, paraffinic solvents and the like.

Polymerization systems which are employed are any of those typically utilized in the free radical polymerization of ethylenic compounds. Such free radial initiators include peroxide initiators, azonitrile (the du Pont VAZO catalysts) initiators and include benzoyl peroxide, lauroyl peroxide, ammonium or potassium persulfate, azo bisisobutyronitrile and the like. The amount of catalyst may vary and suitable quantities are readily determinable. Generally, the amount of catalyst will range from 0.002 to 0.2 wt. % of monomer content depending upon the type and solubility of the monomer and initiator. The initiator may be either oil or water soluble. Polymerization can also be accomplished by utilizing high energy radiation such as gamma radiation, high energy electrons from an accelerator, ultraviolet radiation or the like. The polymerization temperature may vary and can range from about or below room temperature up to in excess of 70° C. A particularly preferred polymerization initiation system comprises nitrilo trispropionamide and potassium or ammonium persulfate. With this system, typical polymerization temperatures range from 40° to 50° C.

The relative proportions of water to oil is not critical and may vary so long as the emulsion is a water-in-oil emulsion. Additionally, the relative amount of monomer to water and oil similarly is not critical and may vary with the total amount of monomer being retained at a level such that the monomer is in the water phase of the emulsion prior to polymerization and the polymers are retained in the aqueous phase subsequent to polymerization, a monomer or polymer content of 10-30% has been found to convenient, however, other concentrations can be used.

The polymer emulsions prepared by this technique are extremely shelf stable. The resulting water-in-oil emulsion may be inverted into an aqueous system so as to provide for rapid dissolutionment of the polymer into the aqueous phase. It is particularly preferred to incorporate into the final water-in-oil emulsion an emulsifier for inverting the water-in-oil emulsion into an oil-in-water emulsion. Emulsifiers suitable for this purpose are well known in the art and include both water soluble nonionic and anionic surfactants. The amount of additional surfactant added after the polymerization has been completed so as to provide for ready inversion of the resulting emulsion is not critical but will range typically from 0.0 to about 10% of the total composition. The incorporation of this additional emulsifier after completion of the polymerization accelerates the inversion of the water-in-oil emulsion system when added to the aqueous medium. If such acceleration is not desired or necessary as with certain highly anionic polymers, the addition of this surfactant can be omitted. The polymer emulsions prepared by this technique find particular utility as flocculants for water treatment and as rheology modifiers for aqueous based systems. The anionic polymer emulsions prepared by the present technique can be utilized in the same manner as the polymer emulsions disclosed in U.S. Pat. Nos. Re. 28,474 and Re. 28,576.

The polymer emulsions prepared by the present technique have numerous advantages over those prepared by the prior art technique. First, the emulsions which are prepared are essentially free of polymer grit and can be used as is without filtration or other processing. Also, the use of the nonionic/anionic system facilitates the preparation of many anionic polymers which are not readily prepared using only nonionic emulsifiers. If desired, additional surfactants to assist in the inversion of the emulsions may be added subsequent to polymerization. Another advantage to the polymer emulsions prepared by the present technique is the long shelf life of the resulting emulsions. Prior art emulsions had tended to separate after as little as several weeks. The present emulsions have demonstrated long shelf lives. This is a distinct advantage since if the emulsion separates during storage, it must be reemulsified before it can be successfully used. The need to reemulsify the emulsions negates the advantage of employing an oil-in-water emulsion.

The following examples are intended to illustrate the present invention only and are not indicative of the limits of the invention.

In order to establish the relationship of the anionic emulsifier content and the HLB of the nonionic portion of the emulsifier as the two interrelate and contribute to the synthesis of good quality water-in-oil emlsion polymers of acrylamide and sodium acrylate model systems were selected. Blends of fatty acid and alcohol ethoxylates having calculated HLB values between 5 and 9 were chosen as the nonionic portion of the emulsifier. Ditridecyl sulfosuccinate generally was selected as the oil soluble anionic emulsifier component. As the oil component a low aromatic content kerosene fraction having a boiling point range of 190°-250° C. or a mineral spirits having an aromatic content of about seven percent was selected. As a level of acceptable quality, only finished emulsion polymers containing less than 300 ppm of coarse particles or "scrap" were considered successful preparations. Polymers and copolymers of sodium acrylate and acrylamide having acceptable quality were prepared containing from zero to 100 percent sodium acrylate, the remainder being acrylamide. The homopolymer of ammonium acrylate or ammonium methacrylate and similar polymers are readily prepared by this technique. The following experiments demonstrate that as the percentage of sodium acrylate increased in the polymer that both the average HLB of the nonionic emulsifier components and the relative percentage of the anionic emulsifier in the blend needed to be increased in proporation to the increase in sodium acrylate, the anionic component of the polymer.

EXAMPLE 1

Nonionic Polyacrylamide

Acrylamide (1026 grams) and nitrilo trispropionamide (0.4 grams) were dissolved in deionized water (1479 grams) in a flask fitted with an agitator, thermometer, nitrogen sparge tube, droping funnel, reflux condenser, and a heating and cooling mantle. To the acrylamide solution was added a low aromatic kerosene (713 grams) containing a mixture of ethoxylated oleyl alcohols (157 grams) having an average calculated HLB of 5.1. The mixture was purged with nitrogen while heating to 45°–50° the polymerization was initiated and with appropriate cooling and heating was maintained at 45°–50° C. until the reaction was complete. The smooth off-white emulsion obtained was rendered self-inverting upon dilution in water by the addition of a nonyl phenol polyoxyethanol having an HLB of 13. The scrap content of this emulsion was less than 300 ppm.

The reaction was repeated, but with the addition of 5 grams of tridecyl sulfosuccinate to the kerosene phase. Under the same conditions the filterable scrap or grit content was found to be greater than 1000 ppm.

EXAMPLE 2

Very Low Anionic Polyacrylamide

As in Example 1, the following ingredients were combined. Acrylamide (1005 grams) nitrilo trispropionamide (0.4 grams) and acrylic acid (16 grams) were dissolved in deionized water (1466 grams). The pH of the mixture was adjusted to 7 with sodium hydroxide. To this solution was added a low aromatic content kerosene containing a mixture of ethoxylated oleyl alcohols having a calculated HLB of 5.1 (153 grams) and 6 grams of tridecyl sulfosuccinate. The resulting emission was subjected to the same reaction conditions as described in Example 1. The resulting smooth white emulsion was essentially free of polymeric scrap or grit (less than 200 ppm).

The same reaction was repeated but omitting the sulfosuccinate. The resulting grit level was greater than 1000 ppm.

EXAMPLE 3

Low Anionic Polyacrylamide

As in Example 1, the following ingredients were combined: Acrylamide (1015 grams) nitrilo trispropionamide (0.4 grams) and acrylic acid (96 grams) were dissolved in deionized water (1643 grams) and neutralized with sodium hydroxide. To this solution was added a low aromatic content kerosene (780 grams) containing a mixture of ethoxylated oleyl alcohols having a calculated HLB of 6.3 (160 grams) and ditridecyl sulfosuccinate (19 grams). Polymerization proceeded as in Example 1 to yield a smooth white emulsion polymer containing only a trace of filterable grit.

EXAMPLE 4

As in Example 1, the following ingredients were combined: Acrylamide (696 grams) nitrilo trispropionamide (0.4 grams) and acrylic acid (335 grams) were dissolved in deionized water (1715 grams) and neutralized with sodium hydroxide. To this solution was added a low aromatic content kerosene (740 grams) containing a blend of ethoxylated oleyl alcohol and ethoxylated sorbitan monooleate having a calculated HLB of 7.1 (137 grams) and ditridecyl sulfosuccinate (35 grams). Polymerization was initiated as in Example 1 to yield a smooth white emulsion polymer containing less than 200 ppm filterable grit.

EXAMPLE 5

As in Examle 1, the following ingredients were combined: Acrylamide (696 grams) nitrilo trispropionamide (0.4 grams) and acylic acid (335 grams) were dissolved in deionized water (1715 grams) and neutralized with sodium hydroxide. To this solution was added a low aromatic content kerosene (740 grams) containing a blend of sorbitan monooleate and ethoxylated sorbitan monostearate having a calculated HLB of 7.1 (137 grams) and ditridecyl sulfosuccinate (35 grams). Polymerization was initiated as in Example 1 to yield a smooth white emulsion polymer containing less than 200 ppm filterable grit.

EXAMPLE 6

As in Example 1, the following ingredients were combined: Acrylamide (696 grams), nitrilo trispropionamide (0.5 grams) and acrylic acid (335 grams) were dissolved in deionized water (1715 grams) and neutralized with sodium hydroxide. To this solution was added a low aromatic content kerosene (740 grams) containing a blend of ethoxylated oleyl alcohols and ethoxylated stearic acid having calculated average HLB of 7.05 and ditridecyl sulfosuccinate (35 grams). Polymerization was initiated as in Example 1 to yield a smooth white emulsion polymer containing less than 200 ppm filterable grit.

EXAMPLE 7

As in Example 1, the following ingredients were combined: Acrylamide (460 grams), nitrilo trispropionaide (0.5 grams) and acrylic acid (431 grams) were dissolved in deionized water (1554 grams) and neutralized with sodium hydroxide. To this solution was added a low aromatic content kerosene (666 grams) containing a blend of ethoxylated oleyl alcohols having a calculated average HLB of 7.4 (115 grams) and ditridecyl sulfosuccinate (42 grams). Polymerization was initiated as in Example 1 to yield a smooth white emulsion containing less than 300 ppm filterable grit.

EXAMPLE 8

As in Example 1, the following ingredients were combined: Glacial acrylic acid (786 grams) and nitrilo trispropionamide (2.6 grams) were dissolved in deionized water (1511 grams) and neutralized with sodium hydroxide. To this solution was added a low aromatic content kerosene (666 grams) containing a blend of ethoxylated oleyl alcohols having a calculated HLB of 8.5 (92 grams) and ditridecyl sulfosuccinate (93 grams). Polymerization was initiated as in Example 1 to yield a smooth sodium polyacrylate polymer emulsion containing less than 300 ppm grit.

COMPARISON EXAMPLE

In this preparation the procedure of Nalco, U.S. Pat. No. 3,997,492 was employed except that a portion of the acrylamide was replaced on an equal solids basis with sodium acrylate. The emulsifier blend was comprised of as illustrated in the patent, 4.5% Span 20, 20.7% Span 60, 72.0% Tween 61, and 2.8% Span 80.

Acrylic acid (332.6 grams) was dissolved in deionized water (755.5 grams) and neutralized with 50% aqueous sodium hydroxide (333.4 grams) to the neutralized solution was added 50% acrylamide solution (1203.2 grams) and Versene 100 (0.5 grams) to chelate copper present in the acrylamide solution. To the aqueous monomer solution was added a low aromatic kerosene (869.8 grams) containing the Nalco emulsifier blend (72.0 grams). The emulsion was formed with rapid agitation. To the emulsion was added Vazo 64 catalyst (1.44 grams) dissolved in the low aromatic kerosene (42 grams). Rapid agitation was continued and the emulsion was sparged with nitrogen while heating to 47° C. The emulsion temperature was maintained at 47°±2° C. until the polymerization was complete. When the reaction was complete the emulsion was cooled to 30° C. and filtered through an 800 micron filter cloth. A total of 50.7 grams of unfilterable grit was collected which was greater than 14,000 ppm. This level of grit is approximately 50 times that produced by the present procedure.

EXAMPLE 9

As in Example 1, the following ingredients were combined: Acrylic acid (483 grams), nitrilo trispropionamide (0.9 grams) and acrylamide (420 grams) were dissolved in deionized water (1383 grams) and the solution was neutralized with sodium hydroxide. To the resulting solution was added a low aromatic kerosene (700 grams) containing ethoxylated oleyl alcohol (140 grams) and a mixture of dioctyl and didecyl sulfosuccinates (9 grams). An emulsion was formed by rapid agitation. As in Example 1, polymerization proceeded to yield a smooth fluid white emulsion containing only a trace of polymeric grit.

EXAMPLE 10

As in Example 1, the following ingredients were combined: Arcylic acid (1042 grams), ammonia (210 grams), deionized water (1811 grams), nitrilo trispropionamide (1.96 grams). To the resulting solution was added a low aromatic kerosene containing ethoxylated oleyl alcohols (119 grams) and sodium ditridecyl sulfosuccinate (83 grams). An emulsion was formed by rapid agitation. As in Example 1, polymerization proceeded smoothly to yield a smooth off-white latex containing only a trace of polymeric grit.

EXAMPLE 11

As in Example 1, the following ingredients were combined: Acrylamide (1026 grams), sodium styrene sulfonate (114 grams), nitrilo trispropionamide (0.96 grams), and deionized water (651 grams). The pH of the resulting solution was adjusted to 7, and a low aromatic kerosene (760 grams) containing ethoxylated oleyl alcohols (162 grams) and sodium ditridecyl sulfosuccinate (13 grams) was added. An emulsion was formed by rapid agitation. As in Example, 1 polymerization was initiated and proceeded smoothly to yield a smooth white latex containing less than 300 ppm of scrap as collected by filtration of the latex through a 150 micron filter.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A process for preparing a water-in-oil emulsion of an anionic polymer, which comprises: emulsion polymerizing an anionic monomer in a water-in-oil emulsion containing a mixture of an anionic sulfosuccinate surfactant and a nonionic surfactant.

2. The process of claim 1 wherein the HLB of the nonionic surfactant is from about 3 to about 10.

3. The process of claim 1 wherein the sulfosuccinate is selected from the group consisting of sodium dioctylsulfosuccinate, sodium ditridecylsulfosuccinate, sodium didecylsulfosuccinate and mixtures thereof.

4. The process of claim 1, wherein the anionic surfactant comprises from 0.5 to 50 wt. percent of the total surfactant.

5. The process of claim 1, wherein the anionic surfactant comprises from about 4 to 45 wt. percent of the total surfactant.

6. The process of claim 1 wherein said monomer comprises a mixture of nonionic and anionic monomers.

7. The process of claim 1, wherein said anionic polymer is water soluble.

8. The process of claim 1, wherein said emulsion contains less than 300 ppm of coarse particles.

* * * * *